(12) United States Patent
Roquelaure et al.

(10) Patent No.: US 8,565,940 B2
(45) Date of Patent: Oct. 22, 2013

(54) METHOD OF ENSURING THE INTEGRITY OF FLIGHT DATA AND SYSTEM FOR IMPLEMENTING SAID METHOD

(75) Inventors: Carine Roquelaure, Aix en Provence (FR); Florent Daizé, Fuveau (FR); Mathieu Gester, Velaux (FR)

(73) Assignee: Eurocopter, Marignane Cedex (FR)

( * ) Notice: Subject to any disclaimer, the term of this patent is extended or adjusted under 35 U.S.C. 154(b) by 892 days.

(21) Appl. No.: 12/611,546

(22) Filed: Nov. 3, 2009

(65) Prior Publication Data

US 2010/0114410 A1     May 6, 2010

(30) Foreign Application Priority Data

Nov. 3, 2008    (FR) ...................................... 08 06110

(51) Int. Cl.
*G01C 23/00*       (2006.01)
*G06F 7/00*       (2006.01)

(52) U.S. Cl.
USPC ................... 701/3; 701/14; 701/18; 701/121; 701/492

(58) Field of Classification Search
USPC ............... 701/121, 14, 18, 3, 492; 360/235.6, 360/236.3, 236.4, 237; 342/451, 455, 64, 342/65; 340/980, 945; 244/180, 195, 3.13
See application file for complete search history.

(56) References Cited

U.S. PATENT DOCUMENTS

| 6,467,003 B1 | 10/2002 | Doerenberg et al. |
| 2002/0033946 A1* | 3/2002 | Thompson .................... 356/394 |
| 2007/0033511 A1* | 2/2007 | Davies .......................... 714/799 |

OTHER PUBLICATIONS

French Preliminary Search Report, dated Jun. 29, 2009.

* cited by examiner

*Primary Examiner* — Ian Jen
(74) *Attorney, Agent, or Firm* — Brooks Kushman P.C.

(57) ABSTRACT

A method of transferring and processing flight data of an aircraft including recording the aircraft flight data in an onboard avionics system in a digital format so as to obtain digital data, the flight data including safety impact flight data and flight data having no recognized effect on safety. The method further includes recording at least the safety impact flight data in the onboard avionics system in an additional format dissimilar to the digital format so as to obtain additional flight data, storing the digital data and the additional flight data separately, transferring the digital data and the additional flight data to a monitoring computer on the ground, displaying the digital data on a screen in the form of display digital data, and transferring the digital data and the additional flight data to a complementary interpretation unit so as to generate one of display data and print data relating to the additional flight data.

17 Claims, 3 Drawing Sheets

METHOD OF ENSURING THE INTEGRITY OF FLIGHT DATA AND SYSTEM FOR IMPLEMENTING SAID METHOD

Priority is claimed to French Application No. FR 08 06110, filed on Nov. 3, 2008, the entire disclosure of which is incorporated by reference herein.

The present invention relates to the general field of managing flight data for aircraft, and in particular for helicopters. The invention relates more particularly to transferring flight data to make it available for analysis and operating purposes on the ground. The data, or some of it, might become corrupted, e.g. by display means and/or print means, thereby leading to erroneous information for the user.

Data that is "corrupted" should be understood as data that is erroneous or altered, so that it no longer reflects the real flight data.

BACKGROUND

The processing of erroneous information by the user can be harmful or even dangerous in the operation of the aircraft, insofar as the analysis and processing of the erroneous information defines at least some of the maintenance operations that are performed on the aircraft.

The flight data coming from an on-board avionics system is generally transferred to scrutinizing means on the ground after each flight or mission. It is therefore appropriate to devise safety mechanisms that guarantee the integrity of the flight data while it is being transferred to the ground and while it is being scrutinized.

At present, it is known that each item of flight data, e.g. an indication that a threshold for temperature or for a rotor speed of rotation has been exceeded, is confirmed by the pilot or a crew member prior to being transferred electronically to the scrutinizing means on the ground.

Nevertheless, checking in this way is not without drawbacks. Even if all of the flight data is confirmed, the transfer operation may corrupt some of the flight data before it reaches the scrutinizing means on the ground. Flight data may also be corrupted directly in the scrutinizing means on the ground, to which said data is transferred for analysis purposes.

According to the applicable aviation standards, equipment that is used in general to constitute avionics systems and scrutinizing means on the ground is developed in application of design assurance levels (DAL), A, B, C, D, or E that are defined on the basis of potential effects on flight safety, having the following degrees of criticality: catastrophic, dangerous, major, minor, and no effect, respectively. Catastrophic criticality corresponding to DAL A is the highest and no effect criticality corresponding to DAL E is the lowest.

Each level reflects a quality of design involving greater or lesser ability to accommodate potential equipment failures. A given level thus guarantees that the equipment was designed in application of more or less severe design rules and that the design took greater or lesser account of failure modes for the components of the equipment.

The same applies to the software loaded into such equipment and that manages the flight data. These various design assurance levels (DAL) are themselves known and are therefore not described in greater detail.

Furthermore, it is generally a requirement for the equipment and/or software of avionics systems used for providing functions that are the most critical in terms of flight safety, to demonstrate that no single breakdown can lead to events or repercussions that are potentially catastrophic for the aircraft and its occupants. Reference can be made to the following standards: CS 25, CS 27, CS 29, and FAR 25, FAR 27, FAR 29.

The flight data relating to the most recent mission of an aircraft comprises a set of event records suitable for helping in defining and anticipating maintenance operations, and in particular data delivered by a so-called health and usage monitoring system (HUMS) that monitors the health of parts of the aircraft and their use. The HUMS comprises both the on-board avionics system for recording the flight data and a station on the ground used by the maintenance operator in order to process said data.

The on-board avionics system preferably makes use of two distinct computers, one delivering flight data relating to the health of the equipment of the aircraft, the other delivering data relating to the use of the equipment of the aircraft.

The present invention may be applied in particular to both of those types of flight data, and also to any type of data that is useful for analysis on the ground.

On-board avionics systems contribute to critical functions and they are generally designed so as to guarantee safety, which means using a design assurance level that may be as high as DAL A, and where appropriate involving design or structural precautions that guarantee that no single fault can lead to events having potentially catastrophic repercussions on the aircraft or its occupants.

The flight data is thus associated with functions having flight safety levels that are varied. Data is then distinguished as a function of its nature. Some flight data referred to as "safety impact" data is associated with functions presenting catastrophic, dangerous, or major criticality, i.e. a design assurance level DAL A, DAL B, or DAL C. Such data, if erroneous, can lead to effects that endanger the safety of the aircraft or of the occupants of the aircraft.

Other flight data, referred to as "having no recognized effect on safety" is associated with functions presenting minor or no effect criticality and a design assurance level DAL D or DAL E. If erroneous, this flight data might lead to effects having consequences that are less severe.

In the description below, the term "standard product" should be understood as meaning a product that is sold in quantity without being developed to comply with aviation regulations and in which potential modifications to characteristics, e.g. concerning its components or its performance, cannot be controlled by the user, and specifically by a helicopter manufacturer. Such products or equipment are referred to as being commercial off-the-shelf (COTS).

The scrutinizing means on the ground are generally constituted by an application developed by a manufacturer and computing resources such as a COTS monitoring computer on the ground, e.g. a computer operating with a WINDOWS® environment.

The application is generally developed to a DAL D level and the computing resources are COTS, which means that they present a DAL E level.

Using COTS computer resources also means that it is not possible to demonstrate the absence of any single breakdown that could lead to harmful effects. Under such conditions, it is not possible to guarantee that information or data with a safety impact remains exact while being processed on the ground.

As a result, under such conditions, it is not possible to guarantee the integrity of so-called "safety impact" data presenting catastrophic, dangerous, or major criticality up to and during processing on the ground.

For example, document US 2002/033946 discloses a data transfer method, in particular concerning the operation and/or the maintenance of a removable modular appliance. The method described enables digital images to be recorded, but it does not specify that it comprises digital data having a safety impact and digital data having no recognized effect on safety. The data is recorded for subsequent verification in order to observe possible changes in said data over time. That document does make provision for recording additional data relating to complementary information, but it does not have the function of avoiding corruption of data collected during transfer thereof.

SUMMARY OF THE INVENTION

An aspect of the present invention is to propose a novel method of transferring and processing flight data that does not present the above-mentioned drawbacks and that guarantees the integrity of data transferred to the ground, or that enables the maintenance operator to identify data that has become corrupted during transfer or during processing.

In an embodiment, a novel method of transferring and processing flight data that is simple, reliable, and inexpensive to implement is provided.

In another embodiment, a novel system for transferring and processing flight data that is suitable for implementing the above method, guaranteeing that flight data is not corrupted during its transfer and processing is also provided.

An embodiment of the invention is achieved with the help of a method of transferring and processing data to ensure the integrity of aircraft flight data acquired during a flight by an on-board avionics system, so as to make it possible on the ground to process data that has not been corrupted on being transferred to and processed on the ground, wherein the method comprises:

a) recording the flight data in the on-board avionics system in a digital format so as to obtain digital data comprising both "safety impact" flight and flight data "having no recognized effect on safety";

b) recording at least the "safety impact" flight data in the on-board avionics system in an additional format dissimilar to the digital format, such as pages of character strings, to obtain additional data;

c) storing separately the flight data recorded in flight or on the ground in the different formats in steps a) and b);

d) transferring the flight data as stored in this way to a monitoring computer on the ground, serving to display the digital data on a screen in the form of display digital data;

e) transferring the flight data as stored in this way to complementary interpretation means to generate display data and/or print data relating to the additional flight data;

f) on the ground, comparing the result of displaying the display digital data with the additional data to detect any differences resulting from any corrupted flight data; and g) directing or modifying maintenance operations in response to said comparison.

In an implementation, the method in accordance with the invention includes using as the additional format, a format that is dissimilar to the digital format. The additional format may be constituted for example by pages of character strings in an ASCII type coding.

In an implementation, the method in accordance with the invention includes using at least one file during the storage step.

By way of example, the file(s) include(s) a coding polynomial of the cyclic redundancy check (CRC) type for ensuring the integrity both of storage and of transfer during step e).

In an implementation, the method in accordance with the invention includes using a standard operating system of the WINDOWS® type together with applications software loaded into the monitoring computer on the ground and suitable for processing the digital data and the additional data.

In an implementation, the method in accordance with the invention includes arranging the additional data and the digital data in identical manner so as to facilitate a comparison operation to be performed by an operator.

In an implementation, the method in accordance with the invention includes using the screen of the monitoring computer on the ground to display the display data.

In an implementation, the method in accordance with the invention includes using complementary display means of the screen type, to display the display data.

In an implementation, the method in accordance with the invention includes using complementary interpretation means associated with a printer to print the print data on paper and make a printed document available to an operator for performing the comparison operation with the display digital data viewed on the screen.

In an implementation, the method in accordance with the invention includes using as complementary interpretation means basic functions of the monitoring computer so as to interpret the additional data and generate the display data, which is subsequently displayed.

In an implementation, the method in accordance with the invention includes the on-board avionics system acting during storage step c) to constitute a first flight file containing the digital data and a second flight file containing the additional data.

By way of example, it is also possible to envisage replacing the first and second files by a single file containing in segmented manner both the digital data and the additional data.

In an implementation, the method in accordance with the invention includes transferring the first and second flight files to the monitoring computer on the ground and to the complementary interpretation means, respectively by means of at least a first removable storage medium and at least a second removable storage medium, or by means of a single removable storage medium.

In an implementation, the method in accordance with the invention includes transferring at least the first flight file to the monitoring computer on the ground by means of a single or a first removable storage medium and in transferring at least the second flight file to the complementary interpretation means by means of a communications connection such as an Ethernet connection between the on-board avionics system and a reader device such as a personal digital assistant (PDA), that is suitable for entering into communication with the complementary interpretation means.

In an implementation, the method in accordance with the invention includes using the complementary interpretation means incorporated in the reader appliance for generating the print data and the display data.

In an implementation, the method in accordance with the invention includes using communications means for transferring the print data to a printer.

In an implementation, the method in accordance with the invention includes using communications means for transferring the display data to the screen.

In an implementation, the method in accordance with the invention includes using communications means to transfer the display data to a complementary display means.

In an implementation, the method in accordance with the invention includes generating a first image A from the "safety impact" data recorded in the digital format by translating each item in said data into characters and then by translating each character into a set of pixels of a first color, in generating a second image B from the "safety impact" data recorded in the additional format by translating each character into a set of pixels of a second color, and in superposing the resulting images A and B to detect any zones of color difference from the color obtained by superposing pixels of the first and second colors in identical characters, such zones serving to identify corrupted flight data.

An aspect of the invention is also achieved with the help of a data transfer and processor system for implementing the method in accordance with the invention and comprising:

recording means incorporated in the on-board avionics system and suitable for recording flight data in a digital format and in an additional format, dissimilar to said digital format;

at least a first flight file or at least a first segmentation of a single file, generated by the on-board avionics system and containing the flight data recorded in the digital format;

at least a second flight file or least a second segmentation of the single file, generated by the on-board avionics system and containing the flight data recorded in the additional format;

a monitoring computer on the ground having a screen and loaded firstly with a standard operating system such as WINDOWS® or some other system, and secondly with applications software for processing and displaying the flight data recorded in the digital format;

at least a first removable memory containing at least the first flight file or the first segmentation, and serving to transfer at least the first flight file to the monitoring computer on the ground, or means for setting up a GSM (cell phone) connection between the on-board avionics system and the monitoring computer on the ground, transmitting at least the first flight file or the first segmentation;

transfer means for conveying the second flight file or the second segmentation to complementary interpretation means generating additional data from the flight data recorded in the additional format, such as pages of character strings; and means for displaying or printing the additional means data.

In an embodiment of the system in accordance with the invention, the transfer means are constituted by a first removable memory medium and by a second removable memory medium containing the second flight file or the second segmentation.

In an embodiment of the system in accordance with the invention, the transfer means comprise a communications connection such as an Ethernet connection between the on-board avionics system and a reader appliance such as a PDA, including means for communicating with the complementary interpretation means, thereby transmitting the additional data to obtain the print data or the display data.

In an embodiment of the system in accordance with the invention, the transfer means comprise a communications connection such as an Ethernet connection between the on-board avionics system and a reader appliance such as a PDA, which includes the complementary interpretation means for generating the print data and/or the display data.

An advantage of the present invention lies in the improved safety in the operation of an aircraft, in addition to other safety mechanisms, achieved by checking the integrity of the flight data transmitted from the aircraft to the operator. This checking guarantees that the operator will detect any alteration of the data during transfer and processing.

An advantage of the present invention lies in it being easy to identify flight data that is corrupted within data that has been transferred to the ground and processed on the ground. Consequently, the operator needs to refer to information available in the on-board avionics system or to refer to the opinion of crew members only in the event of data corruption being detected. By means of the method, the analysis of flight information may, by default, be entirely independent of crew members and of indications obtained in the aircraft.

Another advantage is obtained insofar as the system in accordance with the invention makes it possible to handle "safety impact" data, i.e. data associated with functions presenting catastrophic, dangerous, or major criticalities, while nevertheless using means that present design assurance levels corresponding to levels D and E. This is made possible by using two types of flight data that are dissimilar, thereby providing a reasonable guarantee that there is no common cause of error in the transfer to the ground and the scrutinizing on the ground of said flight data.

BRIEF DESCRIPTION OF THE DRAWINGS

The invention and its advantages appear with greater detail from the following description of an implementation given by way of illustration with reference to the accompanying figures, in which.

Elements that are structurally and functionally identical and that are present in more than one of the figures are given a single unchanging numeric or alphanumeric reference.

DETAILED DESCRIPTION

Below, the term "flight file" should be understood broadly, i.e. covering in general manner a flight data set.

Figure 1:
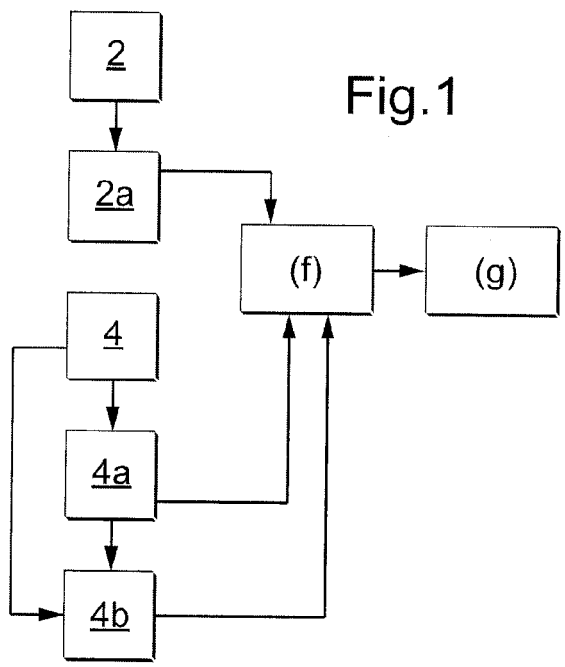
FIG. 1 is a general and fragmentary diagrammatic illustration of an implementation of the method in accordance with the invention for transferring and processing data.

FIG. 1 shows an implementation of the method of transferring and processing flight data. By way of example, it relates to the flight data of an aircraft as acquired by an on-board avionics system 1.

By way of example, the flight data is made up of flight parameters, and of operating parameters relating to equipment, engines, or any other functional portion of the aircraft that is monitored by the on-board avionics system 1.

In step a), the method includes recording flight data in the on-board avionics system 1 in a digital format, said flight data comprising "safety impact" flight data and flight data "having no recognized effect on safety".

Figure 4:
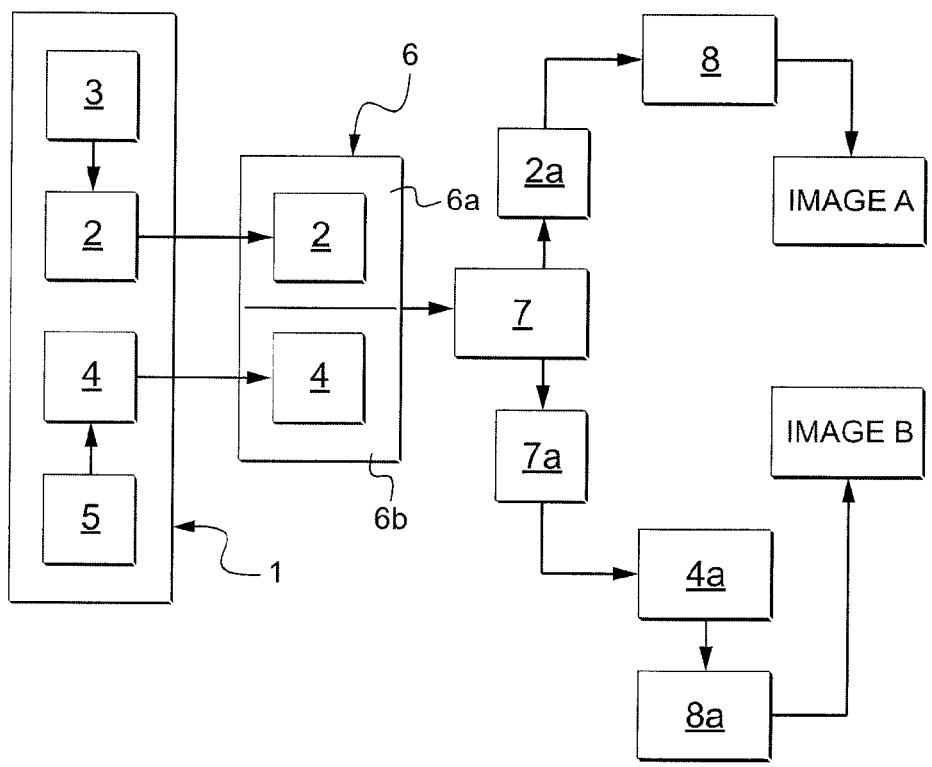
FIG. 4 shows a third implementation of the FIG. 1 method in accordance with the invention for transferring and processing data.

This data is referred to below as digital data 2. The digital data 2 is recorded in conventional recording means 3 as shown in FIG. 4.

In step b), the method includes recording at least the "safety impact" flight data in the on-board avionics system 1 in an additional format, dissimilar to the digital format, e.g. as pages of character strings using ASCII type coding. This data is referred to below as additional data 4 and it is recorded by additional recording means 5, that are likewise conventional and shown in FIG. 4. These additional recording means 5 make use, for example, of the resources of a library of pages of character strings corresponding to the additional format.

The recording means 3 and the additional recording means 5 form part of the on-board avionics system 1.

In step c), the method then includes separately storing the flight data as recorded in flight or on the ground in the two distinct formats of the preceding step. Storage may be performed with the help of a flight file 6 in which the flight data recorded in different formats is stored separately. It can be said that the data is segmented in the flight file 6.

Alternatively, storage may be performed using first and second distinct flight files 6a and 6b, each containing the flight data as recorded in a distinct format.

The on-board avionics system 1 is developed in application of aviation rules corresponding to the safety levels of the functions that use the data being manipulated. Steps a) to c) thus benefit from being handled by the on-board avionics system 1 that is considered as complying with the safety requirements of aviation rules.

Figure 2:
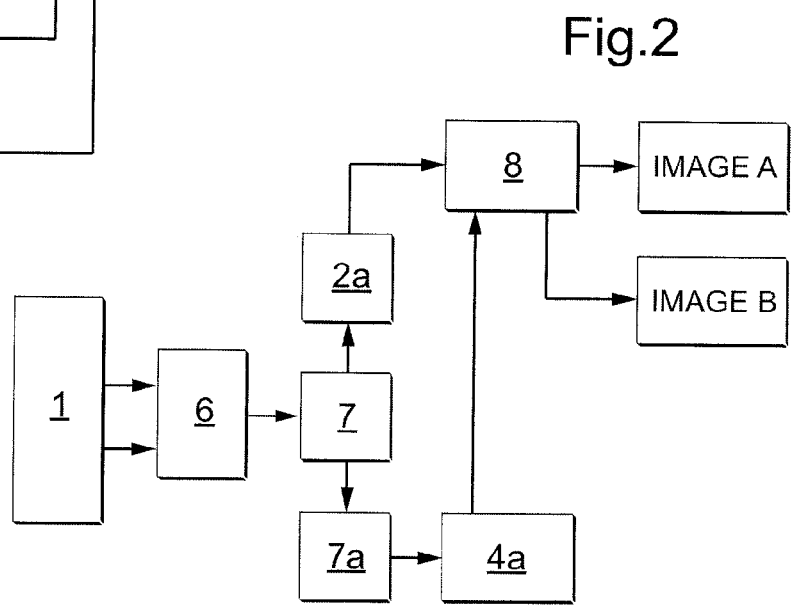
FIG. 2 shows a first implementation of the FIG. 1 method in accordance with the invention for transferring and processing data.
Figure 3:
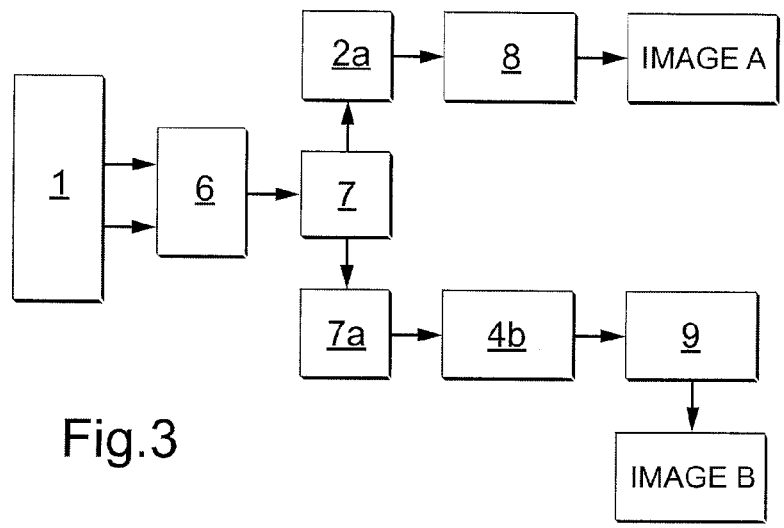
FIG. 3 shows a second implementation of the FIG. 1 method in accordance with the invention for transferring and processing data.

In step d), the method includes transferring the flight data 2, 4 to a monitoring computer 7 on the ground, shown for example in FIGS. 2, 3, and 4, which computer serves to display the digital data 2 on a screen 8.

In step e), the method includes transferring at least the additional data 4 to complementary interpretation means 7a to generate display data 4a and/or print data 4b relating to the additional data 4.

In step f), the method includes comparing the result of displaying the digital data 2 with the display data 4a or the print data 4b in order to detect differences, if any, resulting from flight data being corrupted.

In step g), the method then includes directing or modifying maintenance operations in response to the comparison.

In an implementation, the method includes using a standard operating system of the WINDOWS®, LINUX®, or other type, together with applications software, e.g. standard software, installed on the monitoring computer 7 on the ground, for the purpose of processing the digital data 2. The digital data may be interpreted by the monitoring computer 7 on the ground and by the applications software implementing various calculation, logic, or other operations.

In an implementation, the method includes using basic functions of the monitoring computer 7 on the ground as interpretation means for interpreting the digital data 2 and for generating display digital data 2a.

Advantageously, method in accordance with the invention may include arranging the display digital data 2a in a manner that is identical to the display data 4a or the print data 4b so as to facilitate a comparison operation performed by an operator. This arrangement may be obtained, for example, by using basic functions of the monitoring computer 7 on the ground and by the applications software.

In an implementation, the method in accordance with the invention also includes using the basic functions of the monitoring computer 7 on the ground to act as complementary interpretation means 7a so as to interpret the additional data 4 and generate the display data 4a.

In an implementation, the method in accordance with the invention as shown in FIG. 2 includes using the screen 8 to display the display data 4a. This data may thus be displayed together with the display digital data 2a on juxtaposed portions of the screen 8. The operator can thus compare the two juxtaposed images A and B on the screen 8.

In an implementation shown in FIG. 4, the method includes using complementary display means 8a such as a complementary screen, for viewing the display data 4a. The operator then has two distinct display means for displaying the images A and B corresponding respectively to the display digital data 2a and to the display data 4a.

In another implementation shown in FIG. 3, the method includes using complementary interpretation means 7a associated with print means such as a printer 9 to print the print data 4b on paper and make a printed document available to the operator for comparison with the display digital data 2a.

By way of example, the method in accordance with the invention includes acting in step c) in the on-board avionics system 1 to constitute a first flight file 6a containing the display data 2 and a second flight file 6b containing the additional data 4.

By way of example, the method in accordance with the invention includes transferring the first and second flight files 6a and 6b to the monitoring computer 7 on the ground and to the complementary interpretation means 7a, either via a single removable storage medium 10 or respectively via at least one first removable storage medium 10a and at least one second removable storage medium 10b.

Figure 6:
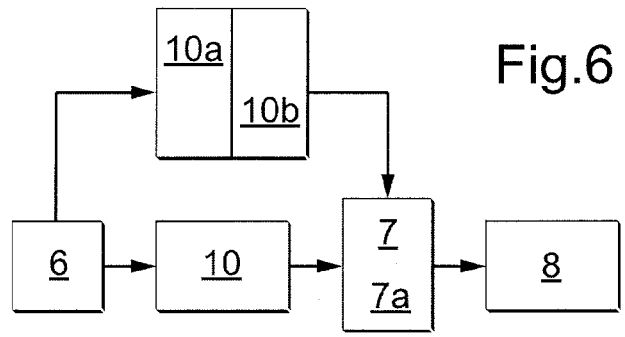
FIGS. 6, 7, and 8 are diagrammatic illustrations of embodiments of a system in accordance with the invention for transferring and processing data.
Figure 7:
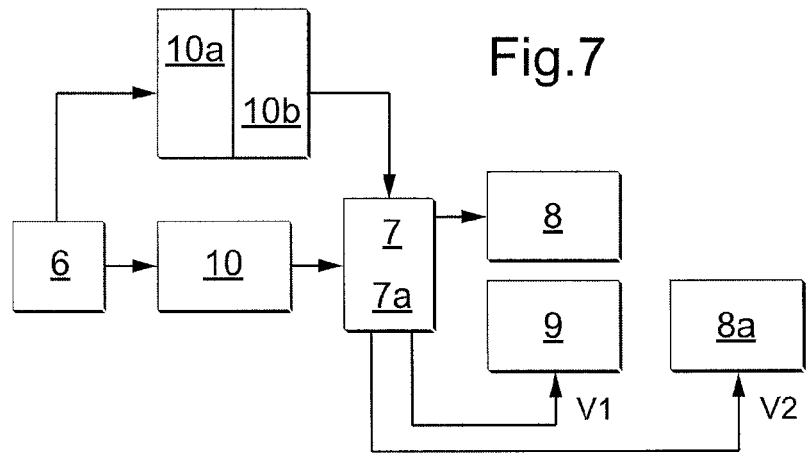
Figure 8:
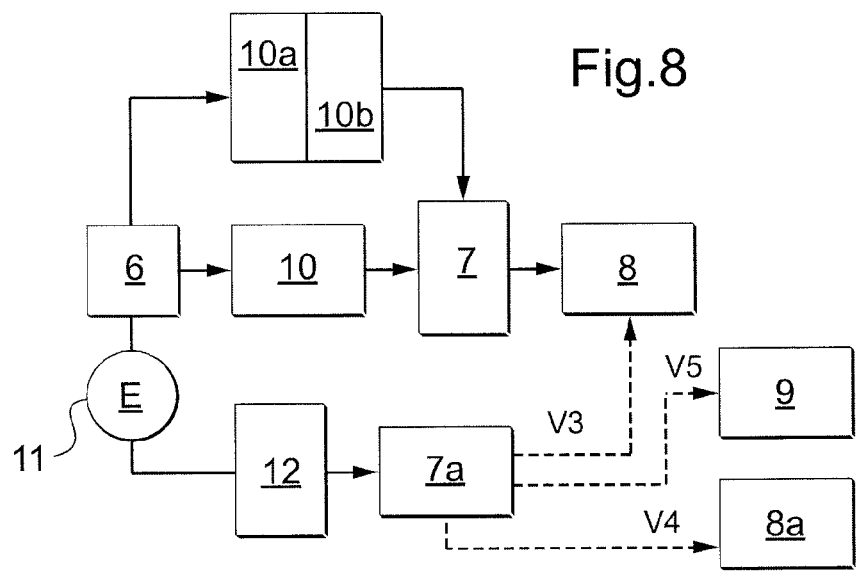

The files 6a and 6b may also be replaced by the single file 6. Reference can be made to FIGS. 6 to 8, for example.

In one implementation, the method thus includes transferring the flight file 6 to the monitoring computer 7 on the ground and to the complementary interpretation means 7a by means of the removable storage medium 10.

In another implementation, the method in accordance with the invention for transferring and processing data includes transferring the flight file 6 to the monitoring computer 7 on the ground by means of the removable storage medium 10, and in transferring said flight file 6 to the complementary interpretation means 7a by means of an Ethernet connection 11.

This connection is set up between the on-board avionics system 1 and a PDA or laptop computer type reader device 12 suitable for being put into communication with the complementary interpretation means 7a, which means may be incorporated in the control means of the printer 9, for example.

In another implementation, the method includes using the complementary display means 8a, of the screen type, to view the display data 4a. Under such circumstances, it is possible to envisage incorporating the complementary interpretation means 7a in the reader device 12.

The method in accordance with the invention thus includes using communications means, of the wired, infrared, or other type, for transferring the display data 4a to the screen 8 or the complementary display means 8a or for transferring the print data 4b to the printer 9.

In another implementation, the method includes generating the first image A from the "safety impact" data recorded in the numerical format by translating each character of said data into a set of pixels in a first color, and in generating the second image B from the "safety impact" data recorded in the additional format by translating each character into a set of pixels in a second color different from the first color.

Figure 5:
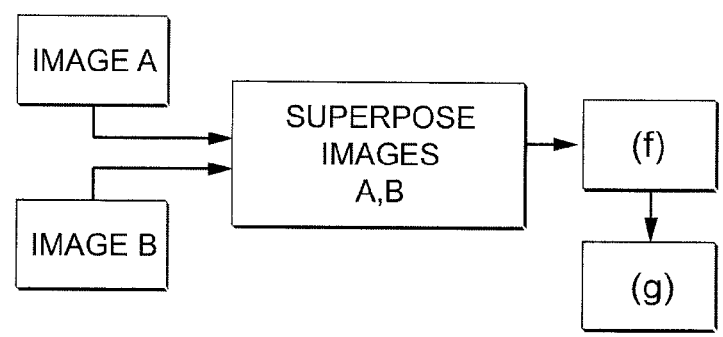
FIG. 5 is a diagrammatic illustration of an execution variant of the first implementation of the FIG. 2 data transfer and processing method.

In this implementation, e.g. shown in part in FIG. 5, the method includes superposing the images A and B as obtained in this way on the screen 8 in order to detect any error zones that are colored differently from the coloring obtained by superposing the pixels of the first and second colors wherever identical characters are superposed. The error zones enabling corrupted data to be identified are those that present a color difference compared with the coloring that is obtained by superposing the first and second colors. The error zones then present coloring corresponding to the first color or to the second color, and they are consequently easily identified.

In an implementation of the method in accordance with the invention, use is also made prior to recording the digital data 2 and the additional data 4 of a CRC type coding polynomial for coding said data.

The data 2, 4 is thus recorded in digital form and in additional form in a file that is advantageously associated with a coding polynomial (CRC) for transferring the data to the station on the ground. The file is subsequently decoded on the ground using the corresponding coding polynomial to verify that the digital data 2 and the additional data 4 complies with the coding polynomial, in particular prior to generating the display data 2a, the digital data 4a, and the print data 4a.

The present invention also provides a system for transferring and processing data to implement the method as described above. The data transfer system is shown diagrammatically in FIGS. 6 to 8.

The system for transferring and processing data comprises recording means 3 and 5 incorporated in the on-board avionics system 1 and suitable for recording the flight data in two different formats so as to produce the digital data 2 and the additional data 4.

The data transfer and processor system also includes a flight file 6 generated by the on-board avionics system 1 and containing the digital flight data 2 and the additional flight data 4, recorded in each of the formats in segmented manner. This means for example that different memory zones are used that are distinguished by addresses.

It is also possible to envisage using a first flight file 6a and a second flight file 6b respectively containing the digital data 2 and the additional data 4.

The data transfer and processor system also comprises the monitoring computer 7 on the ground having the screen 8 and running a standard operating system of the WINDOWS® type together with applications software for processing the digital data 2 and for displaying said display digital data 2a.

The data transfer and processor system also comprises at least the first removable storage medium 10a containing the flight file 6 and serving to transfer said flight file 6 to the monitoring computer 7 on the ground.

The system in accordance with the invention also comprises transfer means for taking the flight file 6 to the complementary interpretation means 7a that generates the display data 4a and/or the print data 4b on the basis of the additional data 4. The complementary interpretation means 7a may be incorporated in the monitoring computer 7 on the ground, for example.

By way of example, the transfer means are constituted by the second removable storage medium 10b. Reference can be made to FIGS. 6 to 8.

The data transfer system also comprises means for displaying the display data 4a or means for printing the print data 4b.

In the embodiment of FIG. 5 or 6, the display digital data 2a and the display data 4a is viewed on the same screen 8.

In another embodiment, shown in FIG. 7, the print data 4b and the display data 4a is transmitted by the monitoring computer 7 on the ground and by the complementary interpretation means 7a respectively to the printer 9 and to the complementary screen 8a. These various options are represented by respective paths V1 and V2 in FIG. 7.

In a variant embodiment, the path V1 makes it possible to use complementary interpretation means 7a incorporated in the printer 9.

In a variant embodiment of the data transfer and processor system in accordance with the invention, shown diagrammatically in FIG. 8, the transfer means comprise a communications connection of the Ethernet connection type 11 between the on-board avionics system 1 and the reader appliance 12 of the PDA type that includes the means required for communicating with the complementary interpretation means 7a.

The reader appliance 12 can thus use a wired or infrared connection to transmit the display data 4a to the screen 8 or the complementary screen 8a, and the print data 4b to the printer 9, respectively over paths V3, V4, and V5, represented by dashed-line arrows in FIG. 8.

The paths V3, V4, and V5 thus correspond to different ways in which the data transfer and processor system in accordance with the invention can be embodied.

Assuming that path V3 or path V4 is being used, the reader appliance 12 incorporates the complementary interpretation means 7a for generating the display data 4a. The same may apply to the path V5, over which the reader appliance 12 may generate the print data 4b.

This produces results that are remarkable insofar as the method and the system in accordance with the invention make it possible to ensure that the integrity of the overall "safety impact" recording/transfer/processing function is made reliable in spite of using resources on the ground that present low design assurance levels (COTS, DAL D, DAL E).

It is not possible for the data 2 and 4 to be corrupted simultaneously and in the same way given that the natures of the digital data 2 and the additional data 4 are dissimilar.

In addition, it is possible to ensure the integrity of the transfer of the data 2, 4 from the avionics system 1 to the means on the ground with the help of a coding polynomial (CRC), constituting an additional integrity-ensuring element.

It should also be observed that the avionics system 1 is developed in compliance with the safety objectives corresponding to the potential risks associated with erroneous data. There is therefore no need to watch out for the flight data being degraded in the on-board avionics system 1.

Naturally, the present invention can be subjected to numerous variations as to its implementation. Although several embodiments and implementations are described, it will readily be understood that it is not possible to identify exhaustively all possible embodiments and implementations. It is naturally possible to envisage replacing any of the means or steps described by equivalent means or steps without going beyond the ambit of the present invention.

What is claimed is:

1. A method of transferring and processing flight data of an aircraft comprising:

recording, in a recorder of an onboard avionics system of an aircraft in flight, flight data in a digital format so as to obtain digital data indicative of the flight data as recorded in the digital format;

recording, in the recorder of the onboard avionics system, the flight data in an additional format dissimilar to the digital format so as to obtain additional data indicative of the flight data as recorded in the additional format;

storing the digital data in a first removable storage medium and the additional data in a second removable storage medium;

transferring the first removable storage medium having the digital data to a monitoring computer on the ground;

processing the digital data with the monitoring computer to display on a screen an output in the form of display digital data representative of the flight data as recorded in the digital format;

transferring the second removable storage medium having the additional data to a complementary interpretation unit on the ground and processing the additional data with the complementary interpretation unit so as to generate an output in the form of at least one of display data and print data representative of the flight data as recorded in the additional format;

comparing on the ground the result of the display digital data representative of the flight data as recorded in the digital format with the at least one of the display data and the print data representative of the flight data as recorded in the additional format so as to detect any differences resulting from any of the flight data being corrupted; and directing or modifying maintenance operations in response to the comparison.

2. The method as recited in claim 1, wherein the additional format includes pages of character strings.

3. The method as recited in claim 1, wherein storing the digital data includes using at least one file including a cyclic redundancy check (CRC) type coding polynomial so as to ensure the integrity of storage and transfer.

4. The method as recited in claim 1, further comprising using a standard operating system with application software loaded into the monitoring computer on the ground suitable for processing the digital data and the additional data.

5. A method for an aircraft, the method comprising:

recording, in a recording device incorporated in an onboard avionics system of an aircraft in flight, flight data in a digital format so as to obtain digital data indicative of the flight data as recorded in the digital format;

recording, in the recording device, the flight data in an additional format dissimilar to the digital format so as to obtain additional data indicative of the flight data as recorded in the additional format;

transferring the digital data and the additional data from the onboard avionics system to a monitoring computer and a complementary interpretation unit, respectively;

processing the digital data with the monitoring computer to generate an output representative of the flight data as recorded in the digital format;

processing the additional data with the complementary interpretation unit to generate an output representative of the flight data as recorded in the additional format; and comparing the output representative of the flight data as recorded in the digital format and the output representative of the flight data as recorded in the additional format so as to detect any difference, wherein the presence of a difference is an indicator of the flight data being corrupted.

6. The method as recited in claim 1, wherein the screen is a screen of the monitoring computer on the ground.

7. The method as recited in claim 1, wherein the displaying is performed using a screen-type complementary display device.

8. The method as recited in claim 1, further comprising printing the print data on paper so as to make a printed document and wherein the comparing is performed using the document with the display digital data visible on the screen.

9. The method as recited in claim 1, wherein the complimentary interpretation unit uses basic functions of the monitoring computer to interpret the additional data and to generate and subsequently display the display data.

10. The method as recited in claim 1, wherein storing the digital data includes storing a first flight file containing the digital data in the first removable storage medium and storing the additional data includes storing a second flight file containing the additional data in the second removable storage medium.

11. The method as recited in claim 5, wherein transferring includes transferring the digital data to the monitoring computer on the ground using a removable storage medium and transferring the additional data to the complementary interpretation unit using a communications connection between the onboard avionics system and a reader device suitable for entering into communication with the complementary interpretation unit.

12. The method as recited in claim 1, wherein comparing includes:

generating a first image from the digital data by translating each item in the digital data into a character and then translating each character into a set of pixels of a first color;

generating a second image from the additional data by translating each character of the additional data into a set of pixels of a second color;

superposing the first and the second images so to detect a zone of color difference by superposing pixels of the first and the second colors in identical characters; and identifying any of the flight data being corrupted by detecting the zone of color difference.

13. A data transfer and processor system for transferring and processing flight data of an aircraft comprising:

a recording device incorporated in an onboard avionics system of the aircraft and configured to record flight data in a digital format so as to obtain digital data indicative of the flight data as recorded in the digital format and to record the flight data in an additional format dissimilar to the digital format so as to obtain additional data indicative of the flight data as recorded in the additional format;

a first flight file generated by the onboard avionics system and containing the digital data indicative of the flight data as recorded in the digital format;

a second flight file generated by the onboard avionics system and containing the additional data indicative of the flight data as recorded in the additional format;

a monitoring computer configured to receive the first flight file and process the digital data of the first flight file to generate an output representative of the flight data as recorded in the digital format;

a complementary interpretation unit configured to receive the second flight file and process the additional data of the second flight file to generate an output representative of the flight data as recorded in the additional format; and wherein the presence of a difference from a comparison of the output representative of the flight data as recorded in the digital format and the output representative of the flight data as recorded in the additional format is an indicator of the flight data being corrupted.

14. The system as recited in claim 13, further comprising a first removable memory containing the first flight file and configured to transfer the first flight file to the monitoring computer.

15. The system as recited in claim 14, further comprising a second removable memory medium containing the second flight file and configured to transfer the second flight file to the complementary interpretation unit.

16. The system as recited in claim 13, further comprising a cellular device connecting the onboard avionics system and the monitoring computer and configured to transmit the first flight file to the monitoring computer and a communications connection between the onboard avionics system and a reader appliance including a communication device configured to communicate with the complementary interpretation unit so as to transmit the second flight file to the complementary interpretation unit.

17. The method as recited in claim 5, further comprising arranging the output representative of the flight data as recorded in the digital format and the output representative of the flight data as recorded in the additional format in a common manner so as to facilitate a comparison operation to be performed by an operator.

\* \* \* \* \*